US010242169B2

(12) United States Patent
Armando

(10) Patent No.: US 10,242,169 B2
(45) Date of Patent: Mar. 26, 2019

(54) METHOD FOR IDENTIFICATION OF USER'S INTERACTION SIGNATURE

(71) Applicant: NEITEC SP. Z O.O., Lomianki-Kielpin (PL)

(72) Inventor: Marco Armando, Lomianki-Kielpin (PL)

(73) Assignee: NEITEC SP. Z O.O., Lomianki-Kielpin (PL)

( * ) Notice: Subject to any disclaimer, the term of this patent is extended or adjusted under 35 U.S.C. 154(b) by 0 days.

(21) Appl. No.: 15/548,385

(22) PCT Filed: Mar. 15, 2016

(86) PCT No.: PCT/EP2016/055517
§ 371 (c)(1),
(2) Date: Aug. 2, 2017

(87) PCT Pub. No.: WO2016/150756
PCT Pub. Date: Sep. 29, 2016

(65) Prior Publication Data
US 2018/0046787 A1    Feb. 15, 2018

(30) Foreign Application Priority Data

Mar. 25, 2015    (EP) .................................... 15160867

(51) Int. Cl.
*G06F 7/04*    (2006.01)
*H04L 9/32*    (2006.01)
(Continued)

(52) U.S. Cl.
CPC ............ *G06F 21/316* (2013.01); *G06F 21/32* (2013.01); *G06F 21/6218* (2013.01); *G06F 21/36* (2013.01)

(58) Field of Classification Search
CPC .... G06F 21/316; G06F 21/6218; G06F 21/36; G06F 21/32
(Continued)

(56) References Cited

U.S. PATENT DOCUMENTS 6,421,453 B1    7/2002    Kanevsky et al.
7,120,607 B2    10/2006    Bolle et al.
(Continued)

FOREIGN PATENT DOCUMENTS

GB         2470579        12/2010
WO    2012/152995 A1    11/2012

OTHER PUBLICATIONS

International Search Report for International Application PCT/EP2016/055517, dated Apr. 29, 2016.
(Continued)

*Primary Examiner* — Aravind K Moorthy
(74) *Attorney, Agent, or Firm* — Oppedahl Patent Law Firm LLC

(57) ABSTRACT

Method for identification of a interaction signature of a user, comprising the flowing steps of: acquisition of a direct data (10), acquisition of an indirect data (20), acquisition and mapping of the environment (30), to obtain an interaction data set characterized in that the method comprising further steps of establishing an interaction space comprising representation (50) of characteristics of an interaction build upon interaction data set; searching through an interaction space historic data for a pattern of characteristics of an interaction to identify a user, or storing interaction data in an interaction space for future identification.

9 Claims, 7 Drawing Sheets

(51) Int. Cl.
*G06F 21/00* (2013.01)
*G06K 9/00* (2006.01)
*G06F 21/31* (2013.01)
*G06F 21/32* (2013.01)
*G06F 21/62* (2013.01)
*G06F 21/36* (2013.01)

(58) Field of Classification Search
USPC .................. 726/19, 5, 6; 713/168, 170, 186; 382/115, 119–123
See application file for complete search history.

(56) References Cited

U.S. PATENT DOCUMENTS

| | | | |
|---|---|---|---|
| 8,353,764 | B2 | 1/2013 | Williams et al. |
| 8,752,144 | B1* | 6/2014 | Kaufman ............ H04L 63/0861 704/200 |
| 2004/0210607 | A1* | 10/2004 | Manchanda ...... G06F 17/30592 |
| 2007/0213967 | A1* | 9/2007 | Park ........................ G03F 7/705 703/13 |
| 2010/0115610 | A1 | 5/2010 | Tredoux et al. |
| 2011/0050394 | A1* | 3/2011 | Zhang ..................... G06F 3/045 340/5.82 |
| 2011/0090541 | A1* | 4/2011 | Harper .................... G06F 21/32 358/474 |
| 2011/0231666 | A1* | 9/2011 | Guenther ................ G06F 21/32 713/186 |
| 2014/0078061 | A1 | 3/2014 | Simons et al. |
| 2014/0123253 | A1 | 5/2014 | Davis et al. |
| 2014/0157401 | A1 | 6/2014 | Alameh et al. |
| 2014/0280946 | A1* | 9/2014 | Mukherjee ............. H04L 67/16 709/226 |
| 2014/0283005 | A1* | 9/2014 | Avni ....................... G06F 21/64 726/16 |
| 2016/0210453 | A1* | 7/2016 | Seo ......................... G06F 21/32 |
| 2016/0283777 | A1* | 9/2016 | Holden .............. G06K 9/00154 |

OTHER PUBLICATIONS

Written Opinion of the International Searching Authority for International Application PCT/EP2016/055517, dated Apr. 29, 2016.
International Preliminary Report on Patentability for International Application PCT/EP2016/055517, completed Jul. 3, 2017.

* cited by examiner

METHOD FOR IDENTIFICATION OF USER'S INTERACTION SIGNATURE

Present invention relates to the method for identification of user's interaction signature, in particular for identification of a user of the electronic interface (Human Machine Interface).

Invention relates to the field of personal identification, and builds up to biometric systems.

In the prior the art one can find several approaches to personal identification and in particular several ways of composing identification strategy. The strategy chosen defines the scope of the techniques used to process available input signals to reveal the personal characteristics of an user to be determined to establish identification of a user.

The document GB 2470579 presents keystroke metrics, one of the most common behavioural biometric data, as a way of granting a user access to a system. It certainly is quite popular on account of its simplicity and readily available signal on most systems. In use a plurality of test keyboard metrics are generated from a received identity verification request. A typing pattern expressed in the test keyboard metrics is then compared with one or more stored keyboard metrics from a plurality of registered users. If no match is found the user is refused access otherwise the closest registered user is identified. A second comparison of the received keystroke metrics is then made with one or more stored metrics associated with a user in a normally stressed state. Access to the controlled resource is only allowed when a substantial match is found. The metrics used may include inter key latency, hold time or typing error. Metrics for a more stressed state of the user may be stored. These may be recorded by manipulating the emotional state of the user using a number of stimuli such as the International Affective Digitized Sounds and/or measuring the Galvanic skin response of the user. The system and method may be used as part of ATM, door entry system or a portable wireless device.

Another fairly popular among computer users source of biometrical data is the pointing device. It's used to provide information for behavioral biometric authentication and it has been disclosed in U.S. Patent Application US 2014/0078061. Cognitive biometrics comprises augmenting the richness of biometrics signatures that can be extracted from mouse dynamics by introducing perturbations in the response of the computer mouse and measuring the motor responses of the individual user. User responses to unexpected and subtle perturbations reveal new unique sources of information in the mouse movement signal that reflect the user's cognitive strategies and are inaccessible via existing mouse biometric technologies. A user's response to these perturbations contains information about intrinsic cognitive qualities that can be used as a robust biometric for personal authentication and to support profiling of the individual.

The U.S. Patent Application US 2010/0115610 discloses identification of the user over the network based on behavioural patterns and time patterns, including an analysis component for analysing data; an authentication component for authenticating the analysed data; and a behavioural biometric device for collecting behavioural biometric data related to the user, the authentication component and the analysis component operable connected at least with the behavioural biometric device; wherein the behavioural biometric data is matched against previously obtained or expected behavioural biometric data stored in a first database component of the analysis component in order to progressively, continuously, and incrementally evaluate the identification of the user to determine a confidence factor.

The U.S. Pat. No. 7,120,607 reveals authentication method using obscured biometrical data represented as an image. The image that represents biometrical feature can be stolen. In this invention the biometrical image is divided into parts that are scrambled, rotated, flipped or mirrored using predetermined function. Only processed image is shared and used for authentication. The risk of intercepting the biometrical data and using it for other/fraudulent purposes is minimized. A method of doing business is disclosed that transforms a biometric used by a user in a transaction. The transformation creates a distorted biometric. The distorted biometric is used to identify the user to another party without requiring the user to provide actual physical or behavioral characteristics about himself to the other party.

The U.S. Pat. No. 8,353,764 presents invention that relates to authentication of users without using physical biometrical data. Authentication is performed based on image provided by the system and interaction with the user based on this image. In an exemplary embodiment the user is provided with the selection of shapes, after selecting correct image user has to trace the shape of that image to provide behavioral biometrics used for authentication. Techniques for authentication one or more entities are disclosed. Authentication can be performed based on one or more attributes associated with an image and/or input provided in connection with an image. The image is effectively provided for authenticating one or more entities associated with a computing environment. The attributes which can be measured include the manner in which an image has been created and/or traced by a person being authenticated. A person can initially register with an authentication system by creating and/or tracing an image. Subsequently, the person can be provided with the same, similar and/or completely different image in order to be authenticated by the authentication system. It will be appreciated that the image needs not be a signature or provide any personal information about the person being authenticated.

However the remaining need in the field of identification is to create flexible and yet robust systems that can identify a user with an acceptable threshold of trust, while yet would provide readable analytical tool allowing comprehensive verification of the process. Present invention provides a solution to that need by providing a method according to the claim 1.

Invention as disclosed can be used primarily to identify of the user by providing fast and easy to follow pattern recognition scheme in a multi-dimensional space of characteristics. However application of the method does not need to be limited to identification of the user identity, as it can be easily converted into diagnostic tool which based on the pattern of interaction of a user can give help to a doctor in delivering diagnosis.

Invention in a preferred embodiment has been on a drawing in which

The present invention is described below in relation to the preferred embodiment of identification of user's interaction with use of a touch screen, when user leaves a signature with a use of a stylus. This preferred embodiment however (or preferably) shall not be recognized as limiting and the present invention maybe applied to any kind of user interaction within any HMI environment.

Figure 1:
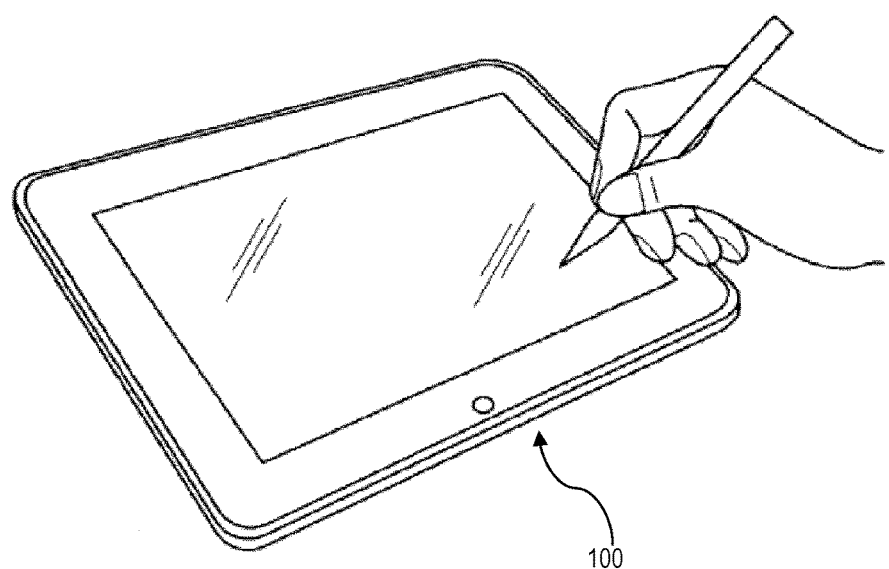
FIG. 1 shows a HMI device used in the present embodiment as a source of input signals.

FIG. 1 shows HMI device being a tablet with a touch screen capable of record interaction with a user by receiving input signals generated by touching its screen with a use of a stylus. The interaction handled according to the invention is placing a signature by the user. What is analysed is an interaction of a user with the HMI, therefore one shall not limit this only to comparing two signature patterns.

This HMI device is capable of collecting all different input values characterizing interaction of a user with an input device. According to the invention input data can be generally divided into three classes of signals: direct data, an indirect data, an environmental data, all of them collected in parallel create interaction data set.

Interaction data set is a representation of an interaction in a multi-dimensional space as it would be seen from all different perspectives. Term 'multi-dimensional' shall be understand then broadly and shall not be limited to 3D Cartesian space, within the concept of the invention the dimension means a characteristic of interaction as speed of drawing or typing, applied pressure, time intervals between pressing of relevant keys, combined with environmental data like temperature, humidity, time of a day, season of the year, information whether the HMI is indoors or outdoors, geo-localisation data etc. Abstract characteristic can be derived from direct or indirect data as behavioural schemes also fit into a definition of a dimension in an multi-dimensional space as they can reflect a probability of making an error while typing for example.

The concept of a dimension is broad and it is not intended to narrow the understanding of an invention to any particular set of inputs or characteristic as the concept is universal to apply equally good to any interaction human being is capable of with a machine.

Figure 2:
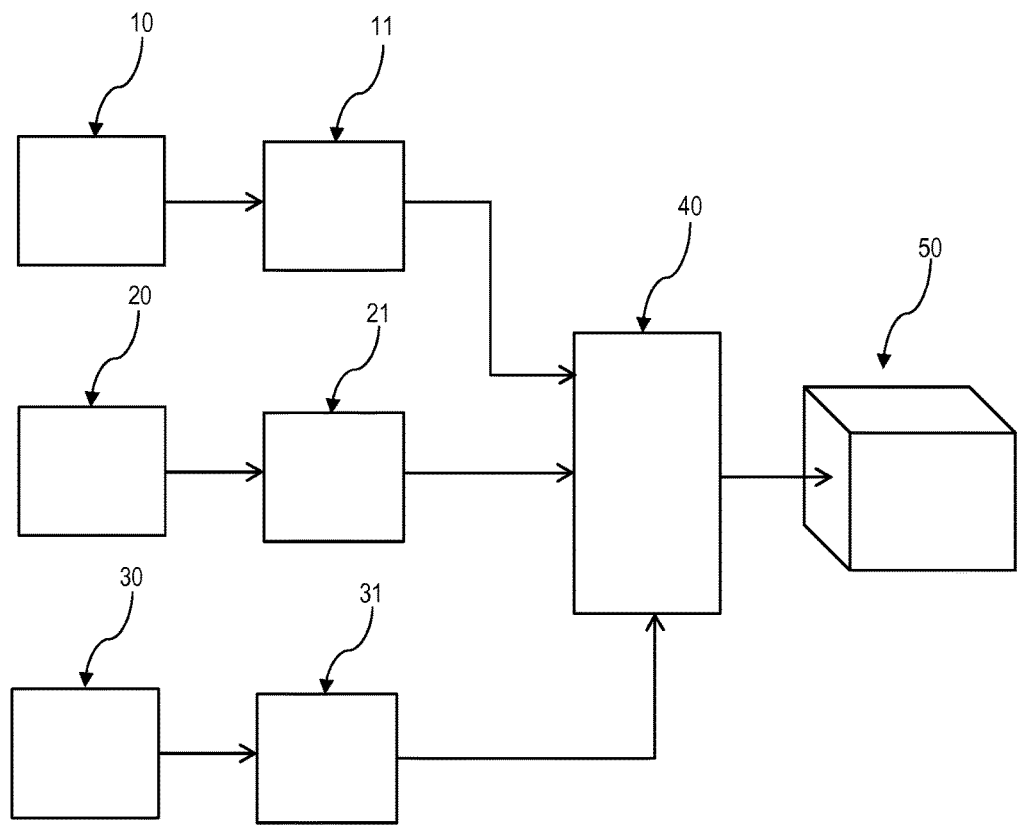
FIG. 2 shows a schematic overview of the method according to the invention creating a multi-dimensional model of an user's interaction.

Referring to FIG. 2 direct data are collected in the step 10 and in the preferred embodiment it can be a two dimensional picture of the trace left by the stylus on a touch screen of a device 100. However direct data can be selected from the group comprising graphic pattern drawn by user, measured speed, measured pressure, reaching interface limits. Direct data are then transferred to the normalization module and being subject of normalization 11 to fit to a common multidimensional space of characteristics of user's interaction.

Step 20 represents collecting indirect data and these are usually data of the higher level that can be calculated based on direct obtained data with a use of the transformation function. Indirect data can be selected from the group comprising angle of interaction, hand mapping, estimated speed, estimated pressure, attrition, estimated body mass, body position, head position, gender, age, psycho-physiological condition. The transformation function can be any known function describing a higher level property of an interaction. In the preferred example this higher level function is a function being a first order derivative of a change of the position in a direction of x over time, namely speed of leaving a trace in a direction x. As the indirect data by any means are not limited in number, indirect data collected in step 20 refers also to collecting a first order derivative of a change of the position in a direction of y over time, namely a speed of leaving a trace in a direction y. Indirect data are also normalized to fit to a common multidimensional space of characteristics of user's interaction. As the indirect data differs from the direct data normalization 21 differs from normalization 11 in a function.

Step 30 represents collecting environmental data, environmental data are related to the environment in which interaction takes place. In the preferred embodiment environmental data represents a size of the touch pad. However these can be any data describing environment, as data representing a physical properties of an HMI like size, attrition, its temperature, hardness of the screen, size of the keys. However they can also include surface analysis, interface particulars, availability to the public, season of the year, time of the day, weather, geographic localization, temperature, system malfunctions.

Also external environment like time of a day, season of the year, amount of light emitted by the screen or hitting the screen and its direction, can be classified and processed as environmental data according to the present invention. The same way data reflecting a temperature and humidity in the proximity of the HMI can be processed. All of these factors can influence user's interaction therefore can be used to build a model of an interaction. Also environmental data are subject to normalization and appropriate normalization function shall be used to represent environmental data in a common multi-dimensional space of interaction characteristics.

Normalization to a common multi-dimensional space is a done at step 11, 21, and 31. These steps reflects different types of data while it's product shall be representation in an uniform space. In the example of the preferred embodiment this uniform multi-dimensional space is a three dimensional Cartesian space divided into two dimensional layers of constant thickness in z direction. Each layer represent one of characteristic of the interaction. This is only one of the potential types multi-dimensional spaces chosen as the one easiest to represent in graphical form.

By normalization one shall understand bringing the representation of a specific characteristic to one common space. Therefore any of the characteristics used to analyse the user's interaction shall be normalized to a two dimensional space, namely an image. Normalization function can be any function transferring an input data set into common space. Following the given example of analysing of an interaction during the placement of a signature on a touch screen. Direct data comprises shape of the signature left by a user and pressure of the stylus used to draw on a touch screen. Consequent indirect data are calculated based on directed data and represents speed of movement. So each of direct, indirect or environmental data shall be represented in a two dimensional space. Further in the normalization can be a multi-level time dependent function. For example signature left on a touch screen can be subject of scaling only to fit the common space but it can also be further transformed into an abstract model eg. it can be represented by a point which position reflects to average distance of all points of signature in x and y direction, namely a signature can be represented by a single point being in fact a geometric centre of the signature.

Different input data may require different normalization functions for speed and/or pressure. A decomposition maybe be used as data set contains three dimensional characteristics, such decomposition for example can be done by splitting the data into two layers: speed vs x—direction and speed vs y-direction. The same normalization shall be done to input representing pressure, it shall be decomposed into pressure vs x—direction and pressure vs y-direction. In the example represented in a drawing each of the two-dimensional decomposed representations is further transformed into a single point being another representation of a centre of the graphic pattern.

After normalization all of two-dimensional representations of the movement can be stack upon to create multidimensional space of characteristics that is represented as three dimensional cube in a given example, while the thickness of each layer may be constant. Surely one can imagine that the thickness of the layer may follow nonlinear pattern and represent a weight given to the particular characteristic or even can change in time to reflect some additional properties.

Exactly the same approach shall be applied to any of the collected inputs. Normalization can be any transformation that produces a pattern in a common space, either linear or non-linear—this gives potential for future optimization.

Normalization function can be parametric and such set of normative parameters can be stored along with the outcome of the normalization process or the final multidimensional pattern that represents user's interaction.

In a step 40 of FIG. 2 all the characteristics are aggregated and combined into a common multidimensional space 50 which in fact is a pattern that represents user's interaction with HMI. In a such form the interaction pattern can be stored in a database for future use.

Figure 3:
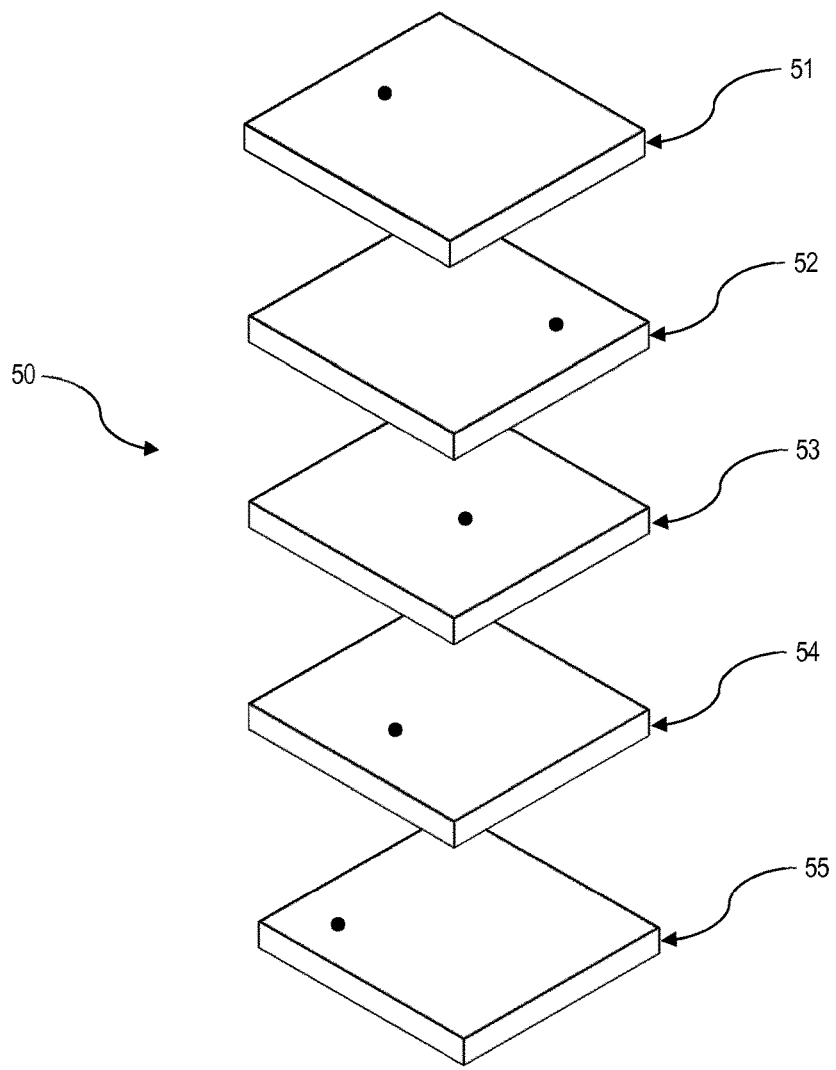
FIG. 3 shows in a schematic way a simplified model of a user's interaction.

FIG. 3 shows the concept of building a multi-dimensional pattern that represents the interaction in a common multi-dimensional space of characteristics. This embodiment shows each of the input data sets represented by a point on a dedicated layer of the three dimensional space of characteristics. Therefore layer 51 represents directly obtained data normalized to a point. The position of this point within the two dimensional space represents certain/defined characteristics of directly obtained data. Layers 52 and 53 represent indirectly obtained data e.g. x and y components of the speed of leaving a signature on an input device of the HMI. While layers 54 and 55 show environmental data representing the variables describing the environment in which HMI is placed e.g. temperature and attrition.

Figure 4:
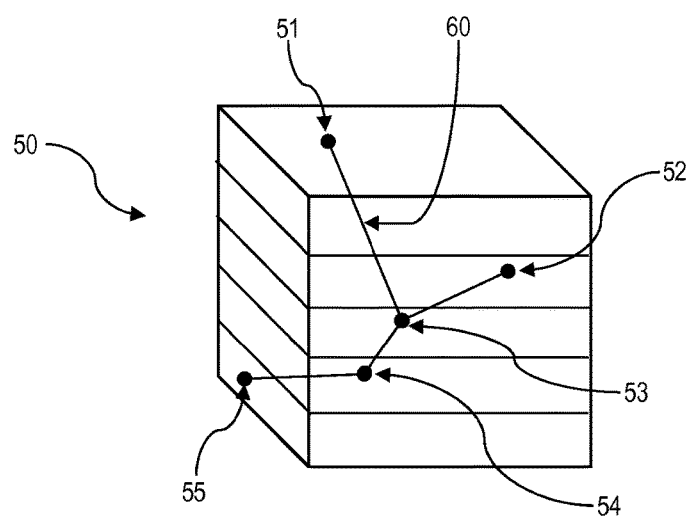
FIG. 4 shows in a schematic way a simplified model of a user's interaction of FIG. 2 with relations explicitly visible.

FIG. 4 shows complete pattern representing user's interaction with HMI, points 51, 52, 53, 54, 55, represent characteristics in each of the layers while linking paths 60 completes the model and represents relations between characteristic points. The overall shape of the three dimensional model describes the user's interaction. This pattern can be compared with other previously recorded patterns to establish identification of the user. The invention is based on noticing the internal relation between characteristic points i.e. a shape of the pattern represents a particular person as each and every human being is different and behaves differently due to different anatomic construction, even though the remaining factors can remain stable.

Figure 5A:
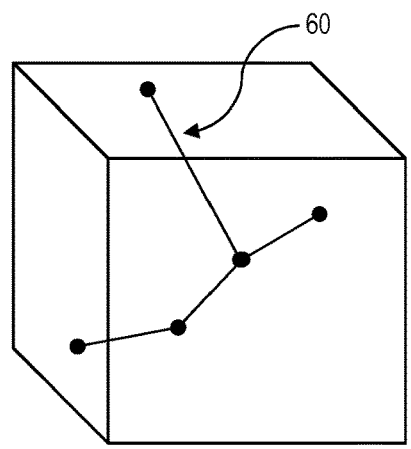
FIG. 5a shows in a schematic way a first interaction represented in a common multi-dimensional space of interaction characteristics.
Figure 5B:
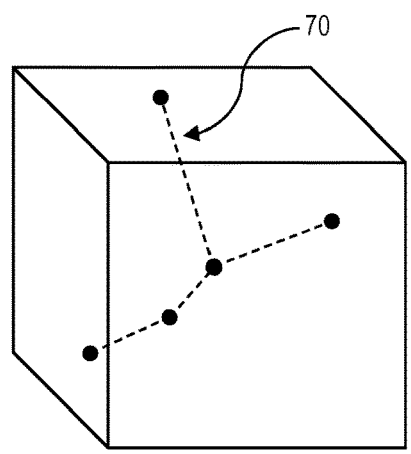
FIG. 5b shows in a schematic way a first interaction represented in a common multi-dimensional space of interaction characteristics.

FIGS. 5*a* and 5*b* shows two patterns 60 and 70 representing user's interaction in two different moments in time. These two patterns can be compared to establish correlation and confirm or exclude similarity. The interpretation of the similarity of the patterns can lead to identification of the user but also can be used to identify disorders related to particular disease. For example it is possible to assign patterns visible in an interaction of the user with HMI to a neural system disorders.

Further interaction patterns can be analyzed to identify incongruousness between direct data and indirect data. This is performed for example by applying boundary test, or limits within multi-dimensional space. This process can be a useful verification tool for easy identification of a malicious activity.

In particular in the identification of a user's identity by comparing interaction's patterns can lead to a positive identification while a difference between standard interaction model or stored interaction model and representation of characteristics of an interaction build upon interaction data is non zero, as there is no two exactly the same interactions of the same user. Too ideal correlation is an indication of fraud or attempt to compromise identification system.

Further identification of an user is positive while a difference between standard interaction model and representation of characteristics of an interaction build upon interaction data is within a dynamically established tolerances. Therefore according to the invention it is possible to apply dynamically tolerances based on for example some or all characteristics of an interaction i.e. a feature of the interaction data.

Figure 6:
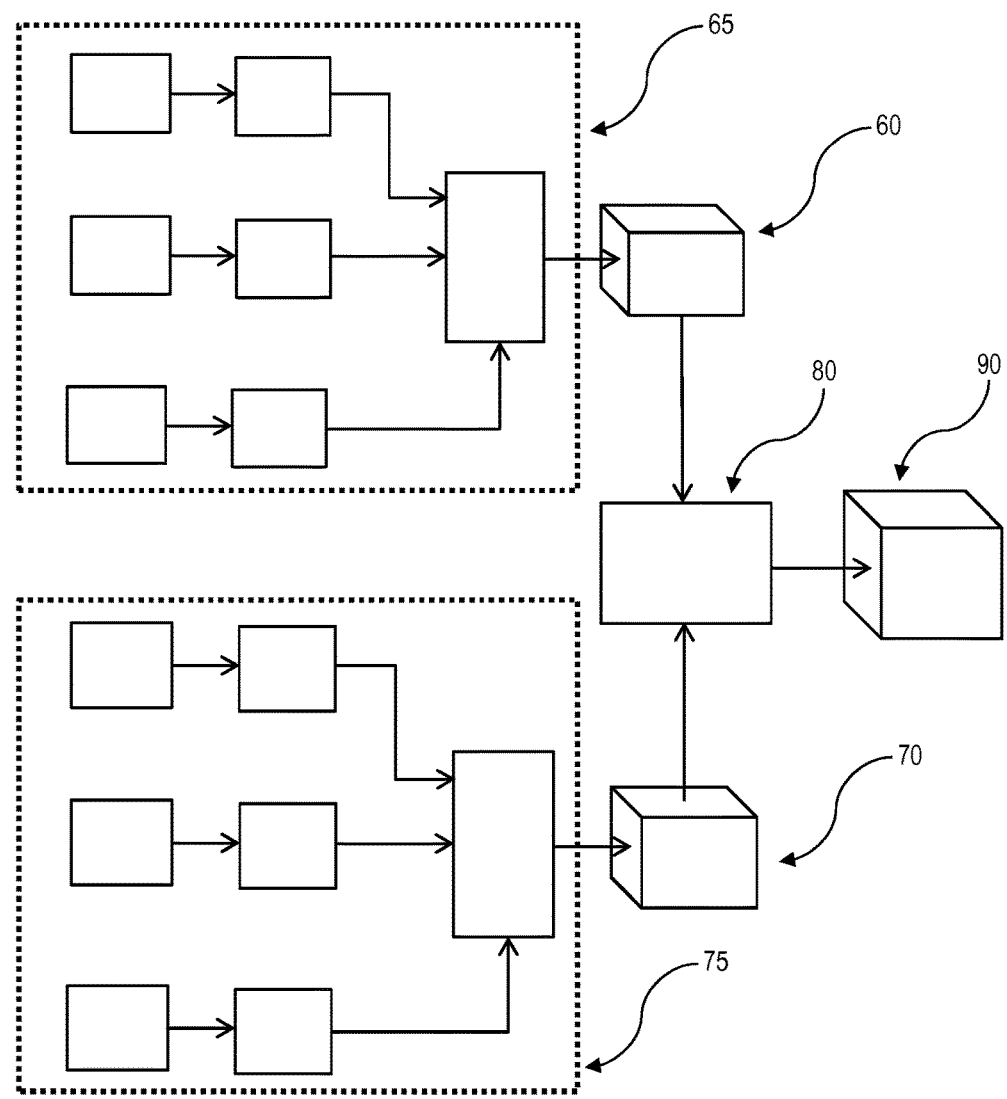
FIG. 6 shows a schematic overview of the method according to the invention creating a differential multi-dimensional model of an user's interaction.

FIG. 6 shows a schematic overview of the method according to the invention creating a differential multi-dimensional model of an user's interaction. This model requires two paths of signal processing where in a path 65 a signals of the user's interaction are used to build model 60 of an interaction, and in a path 75 a standard model of a user is simulating the interaction with HMI in an circumstances identical to one in which user's is situated, to build model 70 of a simulated interaction. Next, these two models 60, and 70 are compared in a step 80 to obtain differential model of interaction 90. With this approach the differential model 90 is used for further evaluation, this method shows a potential in particular when comparing interactions in a different environments or in a different HMI as the differential model seems to be more robust to the changes of the HMIs.

Figure 7:
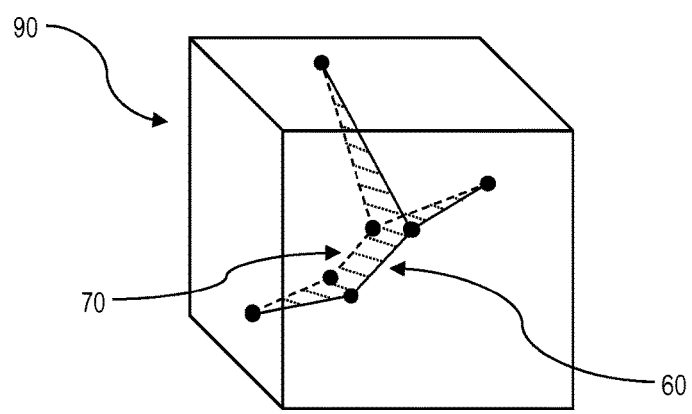
FIG. 7 shows in a schematic way a simplified differential model of a user's interaction obtained in a method of FIG. 6 with relations and difference explicitly visible.

FIG. 7 shows in a schematic way a simplified differential model of a user's interaction obtained in a method of FIG. 6 with relations and difference explicitly visible. This differential model can be analyzed with a use of various techniques e.g. from simple calculation distance between the two patterns to more advanced mathematical tools.

Comparing patterns representing interaction can be performed for example with a help of neural networks that are optimized for searching characteristic patterns in a given space. Any conventional method of pattern recognition can be applied to perform search, including a use of threshold value, correction parameters, etc.

None of the above embodiments shall be considered as limiting to the invention as claimed with enclosed set of claims.

The invention claimed is:

1. Method for identification of a user's interaction signature, comprising:
   acquiring by a Human Machine Interface a direct data (10) forming a first dimension, and
   calculating an indirect data (20) from the direct data (10), thereby forming a second dimension, and acquiring and mapping of the physical environment (30) where an interaction takes place forming a third dimension, thereby obtaining a multidimensional interaction data set, the method further comprising:

establishing a common, normalized multidimensional interaction space comprising: multidimensional representation (50) of characteristics of a Human interaction with an interface build upon the multidimensional interaction data set;

searching through a multidimensional interaction space historic data for a multidimensional pattern of characteristics of an interaction to identify a user's interaction multidimensional signature, by searching for patterns representing relations between data of the different dimensions within the multidimensional interaction data set; and storing multidimensional interaction data set in a multidimensional interaction space for future use.

2. Method according to claim 1 wherein further steps comprises establishing a standard interaction model (70) in the interaction space with a use of
a standard model of a user,
a standard direct data, and
an standard indirect data; and
and data of a physical environment where an interaction takes place, and determining a difference between standard interaction model (70) and representation of characteristics of an interaction (60) build upon interaction data to establish a normalized interaction data (90) which constitutes the user's interaction signature.

3. Method according to claim 2 wherein identification of user's interaction signature is positive while a difference between standard interaction model (70) and representation of characteristics of an interaction (60) build upon interaction data is non zero.

4. Method according to claim 3 wherein identification of user's interaction signature is positive while a difference between standard interaction model (70) and representation of characteristics of an interaction (60) build upon interaction data is within a dynamically established tolerance.

5. Method according to claim 1 wherein direct data and indirect data are analysed to identify incongruousness between direct and indirect data.

6. Method according to claim 1 wherein direct data are selected from the group comprising graphic pattern drawn by user, measured speed, measured pressure, reaching interface limits.

7. Method according to claim 1 wherein indirect data are selected from the group comprising angle of interaction, hand mapping, estimated speed, estimated pressure, attrition, estimated body mass, body position, head position, gender, age, psycho-physiological condition.

8. Method according to claim 1 wherein acquisition and mapping of the environment comprising surface analysis, interface particulars, availability to the public, season of the year, time of the day, weather, geographic localization, temperature, system malfunctions.

9. Method according to claim 1 wherein interaction space is a multidimensional space comprising graphic patterns.

* * * * *